Oct. 4, 1949.　　　C. G. STRANDLUND　　　2,483,565
AGRICULTURAL IMPLEMENT HITCH STRUCTURE
Filed Nov. 6, 1944　　　3 Sheets-Sheet 1
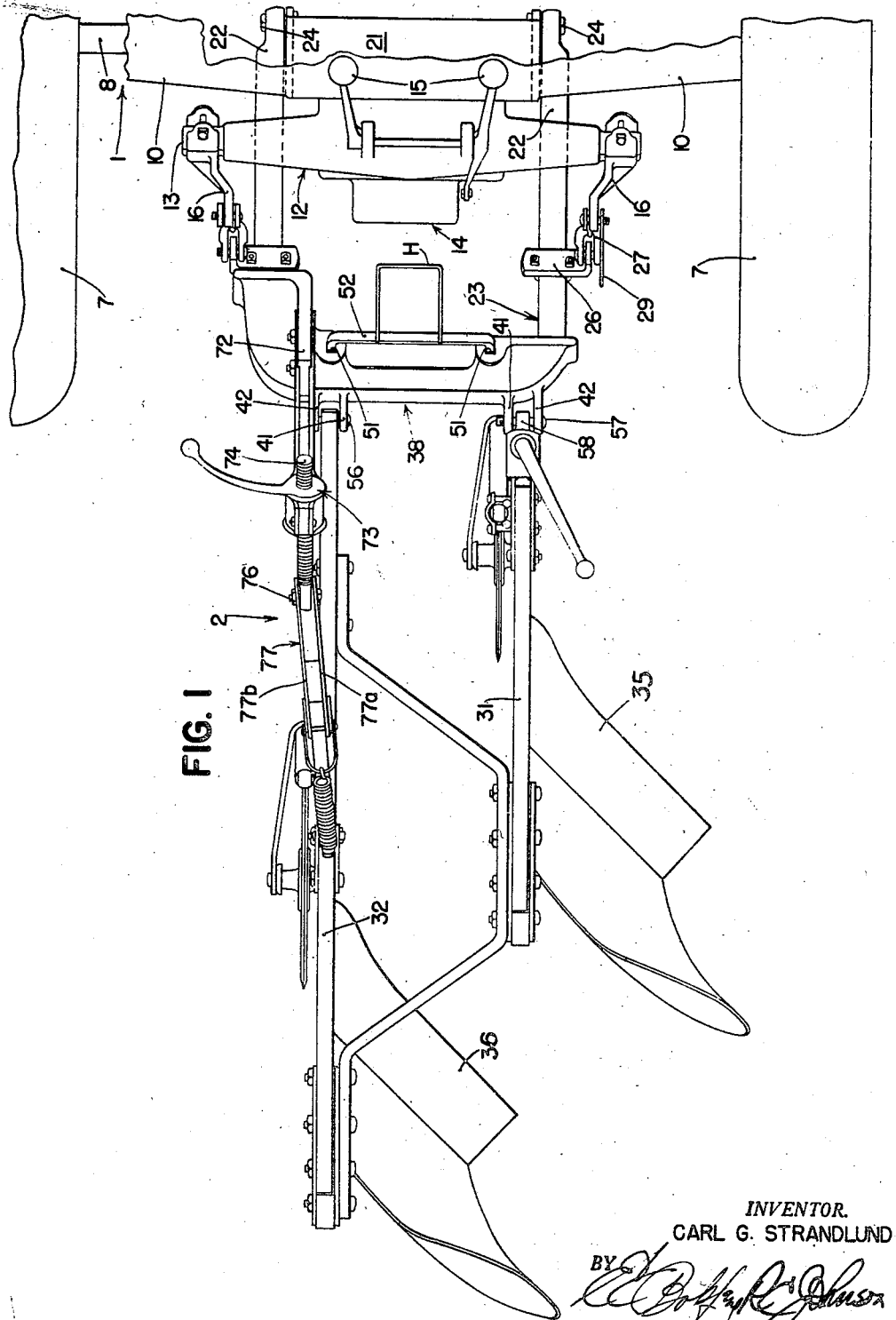
FIG. I
INVENTOR.
CARL G. STRANDLUND
BY
ATTORNEYS

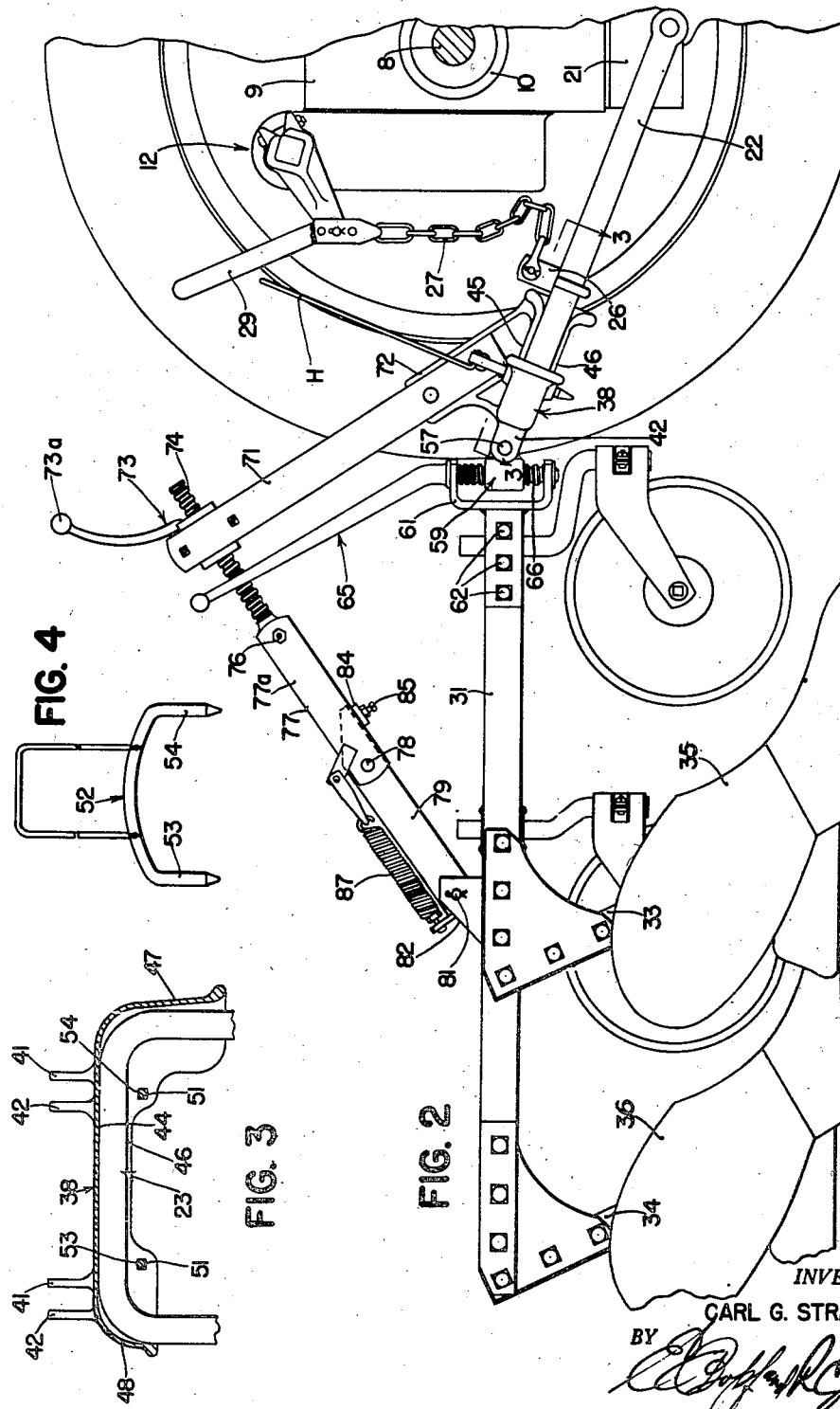

Oct. 4, 1949.                C. G. STRANDLUND                2,483,565
                    AGRICULTURAL IMPLEMENT HITCH STRUCTURE
Filed Nov. 6, 1944                                    3 Sheets-Sheet 3

INVENTOR.
CARL G. STRANDLUND
BY
ATTORNEYS

Patented Oct. 4, 1949

2,483,565

UNITED STATES PATENT OFFICE 2,483,565

AGRICULTURAL IMPLEMENT HITCH STRUCTURE

Carl G. Strandlund, Moline, Ill., assignor to Deere & Company, Moline, Ill., a corporation of Illinois Application November 6, 1944, Serial No. 562,166

19 Claims. (Cl. 97—47)

The present invention relates generally to agricultural implements and more particularly to plows of the integral or direct connected type.

The object and general nature of the present invention is the provision of an agricultural implement that is readily detachable from a supporting and propelling tractor, and a further object of this invention is to provide a simplified arrangement of the adjusting controls for the implement whereby the latter may readily be connected with or disconnected from the propelling tractor. Another feature of this invention is the provision of an implement unit adapted for detachable association with a tractor and which may be connected thereto merely by backing the tractor in place and dropping a retaining pin into position, or may be removed therefrom merely by withdrawing the retaining member, and a still further object of this invention is the provision of means whereby the position of the implement unit may readily be adjusted as desired.

Another important feature of this invention is the provision of a detachable implement unit of the ground working type, represented for instance by a plowing unit, in which an overload release is provided. In one form of the present invention the overload release device is in the nature of a pair of toggle links connected between the frame and an arm on the pivoted attaching member whereby the two parts normally are rigidly held in fixed relation, and a still further feature of this invention is the provision of adjusting means associated with the toggle mechanism whereby the depth of operation of the tools may be adjusted without in any way interfering with the action of the toggle release mechanism in the event an overload occurs.

These and other objects and advantages of the present invention will be apparent to those skilled in the art after a consideration of the following detailed description, taken in conjunction with the accompanying drawings, in which the preferred form of the present invention has been illustrated.

In the drawings:

Figure 1 is a plan view of a tractor and an integral plowing unit detachably associated therewith, in which the features of the present invention have been incorporated.

Figure 2 is a side view of the implement and tractor shown in Figure 1.

Figure 3 is a view taken generally along the line 3—3 of Figure 2.

Figure 4 is a view of the detachable hitch pin.

Figure 5:
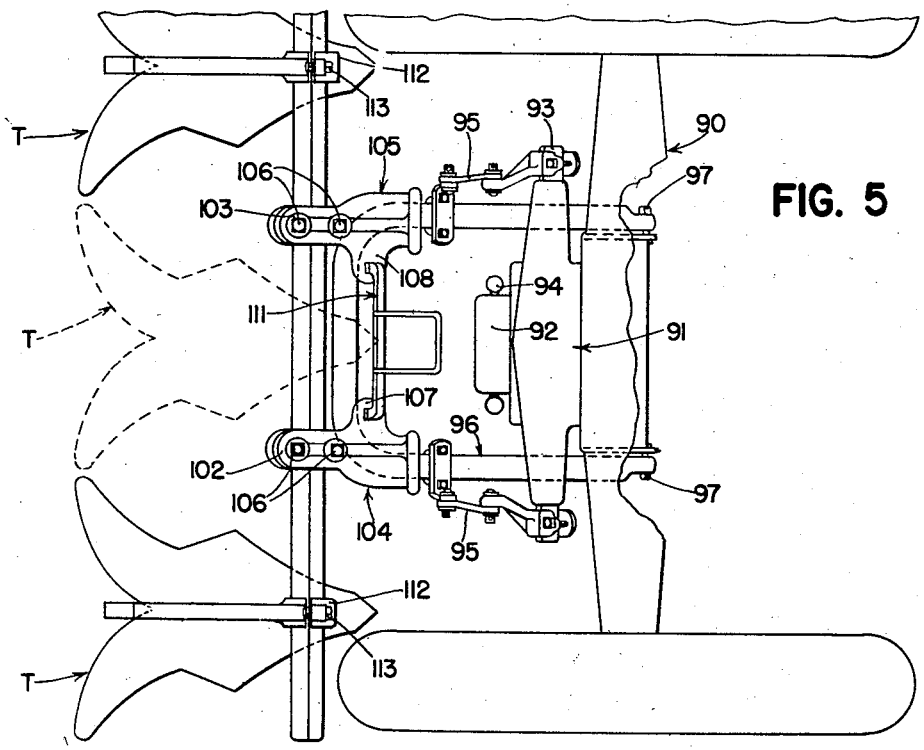
Figure 5 is a rear plan view of a modified form of the present invention wherein a pair of lister or middlebreaker bottoms are provided.

Referring now to the drawings, more particularly to Figure 1, the reference numeral 1 indicates the tractor and the reference numeral 2 indicates the implement which is adapted to be connected by quick detachable means with the tractor. The tractor 1 is of more or less conventional construction, so far as the present invention is concerned, comprising means serving as a supporting or propelling frame carried on front steering wheels and rear traction wheels 7. The latter are mounted on axle shafts 8 which are journaled within a rear axle housing 9, the latter including lateral extensions 10 receiving the axle shafts 8. The tractor 1 is equipped with a power lift apparatus, indicated in its entirety by the reference numeral 12, which is similar to that disclosed in the United States patent to E. McCormick et al., 2,107,760, dated December 8, 1938, to which reference may be made if desired. Briefly, the power lift unit 12 includes a transverse rockshaft 13, rocking movement of which is controlled by suitable valve mechanism contained in a valve box 14. Foot pedals 15 control the action of the valve mechanism. By stepping on one or the other of the foot pedals 15, the power lift arms 16 on the ends of the rockshaft 13 are swung upwardly by energy derived from the tractor motor, preferably through a hydraulic system including a ram unit, a pump, and the controlling valve mechanism 14 referred to above.

Referring now to the features with which the present invention is more particularly concerned, secured to the lower portion of the rear axle housing 9 is a bracket structure 21 to which the forward ends 22 of a U-shaped bail or drawbar 23 are pivoted, as at 24, for generally vertical swinging movement. Arms 26 fixed to the side portions of the drawbar 23 receive chains 27 that extend upwardly and, at their upper ends, are connected to the power lift arms 16. The right hand chain 27 is connected to the associated power lift arm 16 through a hand operated bell crank 29 which, when rocked, may be used to raise or lower the bail 23 when backing into the implement, which will be explained in more detail below. The bail 23 is formed as a rigid sturdy member and may be made of, for example, square bar stock. According to the principles of the present invention, the bail 23 is more or less permanently connected with the tractor and may be raised and lowered by a power unit carried by the tractor. However, the implement unit 2 is adapted to be rigidly connected with the bail 23 and when so connected it may be considered that the bail or drawbar 23 then becomes a part of the implement.

Referring now more particularly to the detachable implement 2, it will be seen from the drawings that the implement 2 has been illustrated as a two-bottom plow having a pair of laterally spaced plow beams 31 and 32 connected together by suitable bracing and including standards 33 and 34 to which the plow bottoms 35 and 36 are connected in the usual manner. A socket or bail-receiving member 38 is formed as a casting, forging or built-up welded part, as desired, and has a pair of rearwardly extending lugs 41 and 42 at each end of the member 38. The latter is formed with a forwardly facing recess or socket 44 having upper and lower wall portions 45 and 46, together with end wall sections 47 and 48. The wall sections 45—48 are so constructed and dimensioned as to snugly receive the rear portion of the bail or drawbar member 23 on the tractor. The forward edge portions of the upper and lower walls 45 and 46 overhang the central portion of the bail 23 so that sufficient stock is provided in which upper and lower registering openings 51 may be formed and in which a detachable dual locking pin 52 may be inserted, with the locking sections 53 and 54 thereof disposed forward of the front edge of the central part of the drawbar 23. These pin sections 53 and 54 therefore provide a pair of laterally spaced members by which the forward pull of the tractor may be transmitted to the implement 2. At least one side of the socket member 38 is extended, as at 47, forwardly so as to embrace at least one of the side members 22 of the bail 23, thus providing for a vertically and laterally rigid connection between the implement and the tractor drawbar or bail 23. The aperture in the beam 32 receiving the pivoted bolt 56 is formed to permit tilting of the plow frame when the block 59 is raised or lowered by turning the crank 65.

The forward ends of the plow beams 31 and 32 are pivotally connected to the lugs 41, 42 in the following manner. The left beam 32 is formed with an aperture in which a pivot bolt 56 is disposed. The bolt 56 extends through suitable openings in the lugs 41 and 42 at the left side of the socket member 38. The lugs 41 and 42 at the right side of the bail-receiving socket member 38 are also apertured to receive a pivot bolt 57 which passes through an opening in a lug 58 formed on a screw-threaded block 59. The latter member is mounted in a bracket 61 bolted, as at 62, to the right hand plow beam 31. An adjusting crank 65 is rotatable in the upper and lower portions of the bracket 61 and at its lower end is screw-threaded, as at 66, to receive the block 59. The latter is held against turning by its connection with the socket member 38, and therefore by turning the crank screw 65, the block 59 may be raised or lowered in its bracket 61 and thus tilt the plow in one direction or the other relative to the socket member 38 about a generally longitudinal axis.

An arm 71 is bolted rigidly to an extension 72 that is formed on or carried by the socket member 38, and the upper end of the arm 71 receives a rotatable screw member 73 in which a threaded rod 74 is received. The rear end of the rod 74 is pivoted, as at 76, to a link 77, and the latter link is pivoted at 78 to a second link 79. The latter link is pivoted at 81, to a bracket 82 carried by the left hand plow beam 32. The link 79 extends along the link 77, the latter being made up of a pair of members 77a and 77b, connected together by a cross plate 84 in which a set screw 85 is disposed. The set screw 85 thus serves as a stop to limit the pivotal movement of one link 77 with respect to the other link 79 in one direction. The set screw 85 is set so that the links 77 and 79 serve as a toggle for rigidly connecting the plow frame with the arm 71 that forms a rigid part of the socket member 38. A spring 87 is connected at one end with one of the links and at the other end with the other of the links and is arranged so as to urge the links toward their straight line position, as shown in Figure 2. The toggle linkage 77, 79 and associated arm 71 thus serve as means rigidly connecting the socket member 38 with the plow frame so that, when the socket member 38 is rigidly connected with the tractor bail 23, the latter member becomes a rigid part of the implement 2, the entire unit being swingable vertically with respect to the tractor about the axis defined by the pins 24. However, the position of the plow beam with respect to the socket member 38 and the bail 23 may readily be adjusted by turning the screw member 73 in one direction or the other, which may be done by manipulating the handle 73a.

The operation of the implement described above is substantially as follows: The pin 52 is withdrawn from the socket member 38, as by pulling upwardly on a handle H, withdrawing the ends 53 and 54 from the openings in the upper and lower walls of the socket member. The tractor is then backed so as to move the rear portion of the bail member 23 into a fully seated position within the socket member 38. The entrance of the bail member into the socket may be facilitated by manipulation of the hand lever 29 in one direction or the other. After the bail is seated in the socket member 38, the operator then reinserts the pins 53 and 54. The outfit is then ready for operation without any further connection whatsoever. The outfit may be lowered into operating position by stepping on one of the pedals so as to cause the power lift rockshafts to be rocked downwardly, thus lowering the bail 23 and the plow frame together as a unit. The operating depth of the plow bottoms may be adjusted by turning the crank 73a in one direction or the other. When it is desired to take the implement off the tractor, the valve mechanism 14 is actuated so as to lower the plow to the ground. Next the pins 53 and 54 are withdrawn. The tractor may then be driven away from the implement without requiring any further disconnections. If, during operation, the plow bottoms should strike a fairly heavy obstruction, such as a rock, stump or the like, the safety release toggle links 77 and 79 will break outwardly, permitting the frame to swing about its pivotal connection with the socket member 38. After the obstruction is passed, the plow frame drops down into its normal position, whereupon the toggle links will move again into their locked position so that parts of the plow frame are locked rigidly to the bail-receiving socket member 38. The plow may be leveled at any time to accommodate different operating depths by turning the crank screw 65 in one direction or the other.

Figure 6:
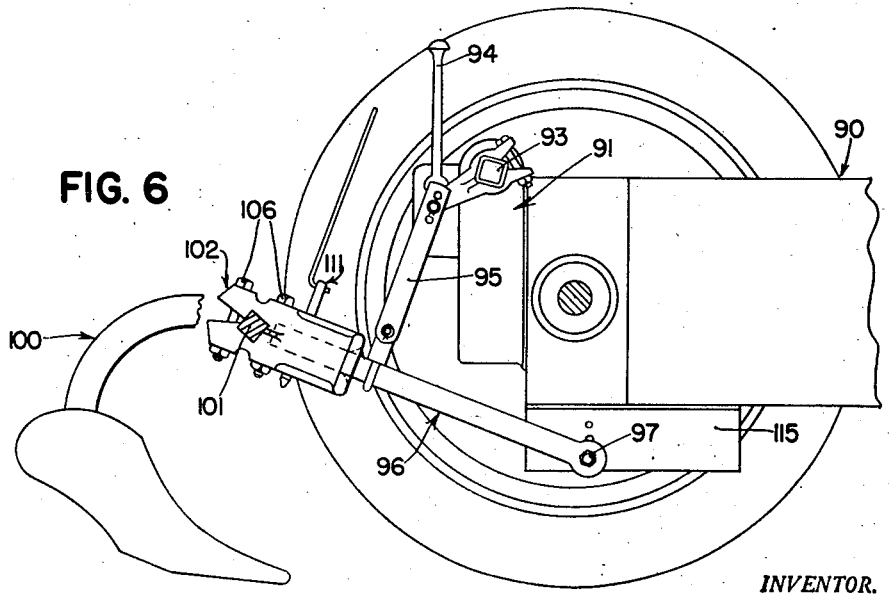
Figure 6 is a side view of the implement shown in Figure 5.

In Figures 5 and 6 I have shown the principles of the present invention as embodied in a two-row lister or bedder of the integral type. In this form of the invention the tractor 90 is provided with a power lift unit 91 which includes a valve unit 92, substantially like that shown in the copending application, Serial No. 453,907, filed August 6, 1942, by Wayne H. Worthington, now U. S. Patent 2,403,422, issued July 2, 1946, operating a rockshaft 93 by a valve lever 94 and by which the rockshaft may be moved into and held hydraulically in different positions. A pair of adjustable links 95 connect the rockshaft to a drawbar 96. The latter member is in the form of a bail similar for all practical purposes to the bail 23 described above. The bail or drawbar member 96 is pivoted, as at 97, to the tractor 90 and is raised or lowered by operating the valve lever 94.

In detachable association with the bail or drawbar 96 is an implement 100 which includes a transverse tool bar 101 extending laterally of the tractor and receiving clamps 102 and 103 which serve to fix right and left hand socket members 104 and 105. These socket members, taken together, constitute a bail attaching member, similar to the socket member 38 described above. The parts 104 and 105 have apertured portions 107 and 108 in which attaching pins 111 may be disposed with ends in front of the central portion of the bail 96. The tool bar 101 receives one, two or more tools T, preferably secured thereto by clamps 112. Bolts 113 hold the clamps 112 rigidly to the tool bar 101. As best shown in Figure 6, the point of pivotal attachment, at 97, between the bail and tractor, may be varied by raising the pins 97 and placing them in different holes in the attaching bracket 115 that is fixed to each side of the tractor. By proper manipulation of the valve lever 94, the bail 96 may be raised or lowered, thus raising or lowering the tools T so as to adjust their depth of operation, or to raise them into a transport or inoperative position.

While I have shown and described above the preferred structure in which the principles of the present invention have been incorporated, it is to be understood that my invention is not to be limited to the particular details shown and described above but that, in fact, widely different means may be employed in the practice of the broader aspects of my invention.

What I claim, therefore, and desire to secure by Letters Patent is:

1. For use with a tractor having a vertically swingable bail and means mounted on and normally permanently connected with the tractor for swinging said bail, the improvement which comprises an agricultural machine including a socket member having a forwardly facing opening adapted to receive the rear portion of said vertically swingable bail, and detachable connecting means carried by said socket member for connecting said socket member rigidly with said bail whereby vertical swinging of the latter acts to raise and lower said socket member.

2. For use with a mobile support having a vertically swingable member and means on said support and connected with said member for swinging the same, the improvement which comprises an implement adapted for detachable connection with said mobile support to be propelled thereby, a member-receiving part open at its forward portion to accommodate movement of said support and member into a position to engage the latter with said member-receiving part so as to be rigid therewith in a generally vertical direction, means for pivotally connecting the implement to said part, a bracket on said part, an adjusting connection between said implement and said bracket for changing the position of the implement relative to said swingable member, and means on said member-receiving part for detachably locking the latter to said swingable member.

3. For use with a tractor having at its rear end a vertically swingable bail and power operated means for vertically swinging said bail, the improvement which comprises an implement attachment adapted to be rigidly connected with said bail to be swung therewith, said implement attachment comprising means serving as an implement frame, a bail receiving socket member having generally upper and lower portions spaced apart vertically to receive the rear portion of said bail therebetween and extending beyond said portion of the bail, said extended portions being apertured, and means extending through said apertures for holding said socket member connected to said bail.

4. An implement adapted to be attached to a tractor having a substantially rigid bail member pivoted thereto and means on the tractor for swinging said bail, said implement comprising means serving as a frame, a bail-receiving socket member shaped to snugly receive the rear portion of said bail, means adjustably connecting said implement frame and bail-receiving member, means for holding the latter on said bail, and means for adjusting the position of said socket member and frame.

5. The combination of an implement including frame means, a forwardly facing socket member, and means pivoting the implement frame means to said socket member at two laterally spaced points, said means including means at one of said points for adjusting the vertical position of that side of the implement relative to said socket member, a propelling unit to which said implement is adapted to be attached and including a bail member constructed to snugly receive the forward part of said socket member when said propelling unit is backed into engaging relation with said implement, and releasable means holding said socket member on said bail member.

6. For use with a tractor having a vertically swingable drawbar and means on the tractor for swinging said drawbar, the improvement comprising an implement including a frame, a drawbar-receiving socket member adapted to be rigidly engaged with said drawbar, means for adjusting the position of the implement frame relative to said socket member, and means for holding the latter in rigid relation on said drawbar.

7. An agricultural implement adapted to be connected to a tractor having a drawbar and means for holding the drawbar in position, said implement comprising means serving as a frame, a drawbar-receiving member pivotally connected to the forward portion of said frame and adapted to receive said drawbar, and overload responsive means connected between said member and said implement frame means and serving normally to hold said drawbar-receiving member against movement relative to said frame.

8. An agricultural implement of the ground working type adapted to be connected to a tractor having a vertically swingable drawbar and means on the tractor for holding the drawbar in one or more given positions, said implement comprising a tool support having ground working tool means connected therewith, an attaching member pivotally connected with the forward portion of said support and so constructed and arranged as to receive and be rigidly connected with the rear portion of said tractor drawbar, an arm rigid with said attaching member, adjustable means extending between said arm and tool support for adjustably holding the latter in a given position with respect to said attaching member so that, when the latter is attached to the tractor drawbar, operation of said adjustable means will serve to adjust the depth of operation of said tool means, and releasable means for holding said attaching member on said drawbar.

9. For use with a tractor having a generally U-shaped bail pivotally connected for generally vertical swinging movement to the rear end of the tractor, the improvement comprising an implement having at its forward end a socket member adapted to receive the rear portion of said bail and to be rigidly held against generally vertical movement relative thereto, said implement including a section pivotally connected with said socket member, and means connected between said implement section and said socket member for controlling the movement of one relative to the other.

10. For use with a tractor having a vertically swingable drawbar and an arm rigid therewith, the improvement comprising an implement adapted to be pivotally connected with said drawbar, and means serving as a strut pivoted to the implement and adjustably connected with the outer end of said arm for holding said implement rigid with said tractor drawbar.

11. For use with a tractor having a generally rearwardly extending vertically swingable bail, the improvement comprising an agricultural implement unit of the self-supporting type detachably associated with said tractor and having at its front end a bail-receiving member adapted to receive and cosely embrace the rear portion of said bail, said tractor having a power lift, a connection extending from said power lift to said bail for raising and lowering the latter by power, and manually operated means acting against said connection for raising or lowering said bail relatively small amounts separately from said power lift when backing the tractor in order to guide said bail into said bail-receiving member.

12. For use with a tractor having a vertically swingable bail, the improvement comprising an implement unit detachably associated with said bail and including a plow frame, furrow opener means carried thereby, a member detachably connecting said plow frame to said bail and to which said plow frame is pivoted, an arm on said member, and a pair of toggle links connected between said arm and said plow frame and arranged to restrain pivotal action between the plow frame and attaching member under normal loads.

13. The invention set forth in claim 12, further characterized by means connecting said toggle links with said arm comprising a rotatable screw member adapted when rotated to adjust the position of said plow frame relative to said bail, thereby serving to adjust the operating depth of said furrow opener means.

14. An implement adapted for quick attachment to a tractor having an operator's station and a rearwardly extending drawbar adjacent and below the operator's station on the tractor, comprising a frame, a socket member open at its forward end and formed to receive the rear portion of said drawbar when the tractor is backed toward the implement, said socket member having upper and lower apertured sections, the apertures in said sections being generally in vertical alignment and forward of the rear edge of said socket member, and releasable means extending generally upwardly and insertable into and removable from said apertures from said operator's station by movement in a generally vertical direction, the spacing of said apertures forward of the rear edge of said socket member serving to position said releasable means in front of the adjacent portion of the tractor drawbar when the latter is seated in said socket member for releasably holding the implement connected with said tractor drawbar, means pivotally connecting the socket member to the implement for movement about a generally transverse axis, and an adjustable connection between said implement and said socket member for controlling the position of said implement.

15. For use with a tractor having a vertically swingable bail, the improvement comprising an implement unit adapted to be detachably associated with said bail and including an implement frame, a member detachably connecting said implement frame to said bail and to which said implement frame is pivoted, an arm fixed to said member, and overload release means connected between said arm and said implement frame and arranged to restrain pivotal action between the implement frame and attaching member under normal loads.

16. For use with a tractor having a vertically swingable bail, the improvement comprising an implement unit detachably associated with said bail and including ground working tool means, a member adapted to be detachably connected with said bail, means pivotally connecting said tool means with said member, and overload release means normally rigid and connected at one end to said tool means and at the other end to said member and adapted to restrain pivoting action therebetween.

17. For use with a tractor having a vertically swingable bail, the improvement comprising an implement unit detachably associated with said bail and including ground working tool means, a member adapted to be detachably connected with said bail, means movably connecting said tool means with said member, and overload release means comprising a compressively rigid unit connected at one end to said tool means and at the other end to said member and adapted to restrain relative movement therebetween.

18. An agricultural implement of the ground working type adapted to be connected to a tractor having a vertically swingable drawbar and means on the tractor for holding the drawbar in one or more given positions, said implement comprising a tool support having ground working tool means connected therewith, an attaching member pivotally connected with the forward portion of said support and so constructed and arranged as to receive the rear portion of said tractor drawbar, an arm rigid with said attaching member, and adjustable means extending between said arm and tool support and including shiftable means movable for adjustably holding the latter in a given position with respect to said attaching member so that, when the latter is attached to the tractor drawbar, operation of said adjustable means will serve to adjust the depth of operation of said tool means.

19. An agricultural implement comprising a plurality of plow beams connected together to form a plow frame, a socket member pivoted to the front ends of said plow beams and having a forwardly facing bail-receiving socket, an arm fixed to said socket member, an adjustable link connecting said plow frame to the outer end portion of said arm, a hitch bail seated at its rear portion in said forwardly facing socket and extending forwardly therefrom, and means on said socket member and engaging said bail for holding the latter in place therein.

CARL G. STRANDLUND.

REFERENCES CITED

The following references are of record in the file of this patent:

UNITED STATES PATENTS

| Number | Name | Date |
|---|---|---|
| 331,284 | Davis | Dec. 1, 1885 |
| 1,556,508 | Hentzell et al. | Oct. 6, 1925 |
| 1,871,841 | Contois et al. | Aug. 16, 1932 |
| 1,901,134 | Strandlund | Mar. 14, 1933 |
| 1,939,950 | Brown | Dec. 19, 1933 |
| 2,030,567 | Bowen | Feb. 11, 1936 |
| 2,072,391 | Varney | Mar. 2, 1937 |

FOREIGN PATENTS

| Number | Country | Date |
|---|---|---|
| 680,004 | France | Jan. 17, 1930 |